US012644997B2

(12) United States Patent
Hu et al.

(10) Patent No.: US 12,644,997 B2
(45) Date of Patent: Jun. 2, 2026

(54) DETECTOR MODULE, DETECTOR, AND MEDICAL IMAGING APPARATUS

(71) Applicant: Neusoft Medical Systems Co., Ltd., Shenyang (CN)

(72) Inventors: Xiaoqing Hu, Shenyang (CN); Yiguang Tan, Shenyang (CN); Lianxue Zhong, Shenyang (CN); Jun Yu, Shenyang (CN); Xin Xiang, Shenyang (CN); Puqing Bai, Shenyang (CN)

(73) Assignee: NEUSOFT MEDICAL SYSTEMS CO., LTD., Shenyang (CN)

( * ) Notice: Subject to any disclaimer, the term of this patent is extended or adjusted under 35 U.S.C. 154(b) by 258 days.

(21) Appl. No.: 18/429,478

(22) Filed: Feb. 1, 2024

(65) Prior Publication Data

US 2024/0168185 A1     May 23, 2024

(30) Foreign Application Priority Data

Aug. 10, 2023     (CN) .......................... 202311015939.0

(51) Int. Cl.
G01T 1/24          (2006.01)
(52) U.S. Cl.
CPC .................................... G01T 1/244 (2013.01)
(58) Field of Classification Search
CPC .................................................... G01T 1/244
See application file for complete search history.

(56) References Cited

U.S. PATENT DOCUMENTS

| | | | | |
|---|---|---|---|---|
| 7,010,088 | B2 * | 3/2006 | Narayanaswamy .... | G01T 1/249 378/19 |
| 7,489,516 | B2 * | 2/2009 | Lacey ................... | A61B 6/032 361/740 |
| 8,824,635 | B2 * | 9/2014 | Tkaczyk ................ | G01T 7/005 378/207 |

(Continued)

FOREIGN PATENT DOCUMENTS

| | | |
|---|---|---|
| CN | 105182395 A | 12/2015 |
| CN | 115462821 A | 12/2022 |

(Continued)

OTHER PUBLICATIONS

First Office Action dated Jan. 27, 2026 received in corresponding patent family application No. CN202311015939.0. English translation attached.

*Primary Examiner* — Uzma Alam
*Assistant Examiner* — Fani Polyzos Boosalis

(57)                ABSTRACT

The present disclosure discloses a detector module, a detector, and a medical imaging apparatus. The detector module includes a detection unit, analog-to-digital conversion units, and a signal transmission unit. The detection module is configured to convert an optical signal into an analog signal. The analog-to-digital conversion units each configured to convert an analog signal into a digital signal. The signal transmission unit is disposed at a side of the detection unit in a first direction and includes at least one first circuit board and second circuit boards. Each of the at least one first circuit board is connected to the detection unit and a plurality of the second circuit boards. Each of the second circuit boards is connected to at least one of the analog-to-digital conversion units.

20 Claims, 3 Drawing Sheets

(56)           References Cited

U.S. PATENT DOCUMENTS

| | | | | |
|---|---|---|---|---|
| 11,246,543 | B2 * | 2/2022 | Tai | A61B 6/037 |
| 12,082,961 | B2 * | 9/2024 | Sun | A61B 6/4488 |
| 2005/0029463 | A1 * | 2/2005 | Kaemmerer | G01T 1/243 |
| | | | | 250/370.01 |
| 2020/0037968 | A1 * | 2/2020 | Takayasu | G01T 1/20182 |

FOREIGN PATENT DOCUMENTS

| | | | | |
|---|---|---|---|---|
| CN | 221308219 U | | 7/2024 | |
| DE | 102012208305 B4 * | 10/2022 | | A61B 6/4233 |

* cited by examiner

DETECTOR MODULE, DETECTOR, AND MEDICAL IMAGING APPARATUS

CROSS-REFERENCE TO RELATED APPLICATIONS

The present application is based on and claims a priority to Chinese Patent Application No. 202311015939.0, filed with China National Intellectual Property Administration on Aug. 10, 2023, the entire disclosure of which is incorporated herein by reference.

TECHNICAL FIELD

The present disclosure relates to the field of medical apparatus technologies, and more particularly, to a detector module, a detector, and a medical imaging apparatus.

BACKGROUND

Detectors belong to the core components of medical imaging apparatus. The development of detector technology propels the advancement of medical imaging apparatus, while in turn, the progression of medical imaging apparatus also puts forward higher requirements for detectors.

A CT apparatus (CT is the abbreviation of Computed Tomography, i.e., electronic computed tomography) is taken as an example. CT spatial resolution, also known as high contrast resolution, is a pivotal parameter to measure the quality of CT images, is a quantitative index to test an image, and refers to an ability to identify subtle nuances in a case of high contrast (density resolution is greater than 10%), i.e., an ability to show a smallest volume of lesions or structures. An increase in CT spatial resolution means an augmented ability to recognize a smallest volume of lesions or structures.

In the related art, a CT detector module having a small pixel (e.g., a high-density CT detector) are used to improve the CT spatial resolution, but the detector module having a small pixel and a limited space size are usually in contradiction with each other. Specifically, the CT detector module having a small pixel means that in a same space, a number of pixels will increase, and more analog-to-digital (AD) converters need to be provided. Meanwhile, in the original space, wiring density of diodes will become much denser than before, which means that a larger space size is required. But it is difficult to flexibly splice the detector module due to too large space size, which restricts clinical applications of the CT detector module having a small pixel.

SUMMARY

The present disclosure aims to solve at least one of the technical problems in the related art. To this end, the present disclosure provides a detector module. The detector module is capable of effectively solving a problem of overly dense wiring due to use of a high-density detector unit or the like, while facilitating enhancement of spatial resolution.

The present disclosure further provides a detector having the above detector module.

The present disclosure further provides a medical imaging apparatus having the above detector.

A detector module according to an embodiment in a first aspect of the present disclosure includes: a detection unit configured to convert an optical signal into an analog signal; analog-to-digital conversion units each configured to convert an analog signal into a digital signal; and a signal transmission unit disposed at a side of the detection unit in a first direction and including at least one first circuit board and second circuit boards. Each of the at least one first circuit board is connected to the detection unit and a plurality of the second circuit boards; and each of the second circuit boards is connected to at least one of the analog-to-digital conversion units.

According to the detector module of the embodiments of the present disclosure, the signal transmission unit includes the at least one first circuit board and the second circuit boards, and each of the at least one first circuit board is connected to the detection unit and the plurality of the second circuit boards. Therefore, the signal transmission unit distributes the analog signals converted by the detection unit to the plurality of first circuit boards after at least one distribution. In this way, the number of signals transmitted via the single second circuit board is effectively reduced. Thus, wiring density and wiring difficulty of the signal transmission unit are simplified to solve a problem of overly dense wiring. Even if the detector module uses a high-density detector unit (e.g., by using a high-density diode, etc.) to enhance spatial resolution, the wiring density of the signal transmission unit can also be effectively reduced.

In some embodiments, at least part of the first circuit board has a thickness direction parallel to the first direction; the second circuit board has a thickness direction parallel to a second direction; the analog-to-digital conversion unit is disposed at a thickness side of a corresponding second circuit board; and the plurality of the second circuit boards is sequentially arranged in the second direction, the second direction intersecting the first direction.

In some embodiments, the first circuit board includes a first board portion and a plurality of second board portions, the first board portion has a thickness direction parallel to the first direction and is connected to the detection unit; and the plurality of second board portions is arranged at intervals in the second direction, and each of the plurality of second board portions has a first end bent to be connected to the first board portion and a second end connected to one second circuit board.

In some embodiments, at least one of outermost two second board portions in the second direction among the plurality of second board portions has a second end extending towards a direction close to remaining second board portions among the plurality of second board portions to be connected to the second circuit board.

In some embodiments, the first board portion is connected to two second board portions, and the two second board portions are disposed at two opposite ends of the first board portion, respectively.

In some embodiments, the first board portion is a rigid circuit board or a flexible circuit board; each of the plurality of second board portions is a flexible circuit board; and the second circuit board is a rigid circuit board or a flexible circuit board.

In some embodiments, the first board portion is a monolithic board, or the first board portion includes a first sub-board portion and a second sub-board portion that are arranged in the second direction. The first sub-board portion is connected to one of the two second board portions, and the second sub-board portion is connected to the other one of the two second board portions.

In some embodiments, each of at least two adjacent second circuit boards of the plurality of second circuit boards connected to a same first circuit board is configured as a predetermined circuit board. Two adjacent predetermined circuit boards each have the analog-to-digital conversion unit provided at opposite sides of the two adjacent predetermined circuit boards, and the analog-to-digital conversion units at the two adjacent predetermined circuit boards are spaced apart from each other to define an accommodation space adapted for mounting of a heat sink.

In some embodiments, the detector module further includes: a shielding unit disposed at the first circuit board or the second circuit board and located a side of a corresponding analog-to-digital conversion unit facing towards the detection unit in the first direction. In the first direction, the shielding unit covers at least one analog-to-digital conversion unit.

In some embodiments, the first circuit board is connected to two second circuit boards, and the two second circuit boards are disposed at opposite ends of the first circuit board, respectively; the two second circuit boards connected to the same first circuit board each have the analog-to-digital conversion units disposed at opposite sides of the two second circuit boards, respectively; and the shielding unit is supported at a side of a part of the first circuit board connected to the detection unit facing away from the detection unit.

In some embodiments, the signal transmission unit is configured such that each of the at least one first circuit board is configured to scatter and transmit at least part of the analog signal converted by the detection unit to the corresponding plurality of second circuit boards.

In some embodiments, a plurality of first circuit boards is provided and sequentially arranged in a second direction and/or a third direction. The first direction, the second direction, and the third direction intersect each other.

In some embodiments, in a second direction, two ends of the signal transmission unit don't extend beyond two width ends of the detection unit, and two ends of the analog-to-digital conversion unit don't extend beyond two width ends of the detection unit; and in a third direction, two ends of the signal transmission unit don't extend beyond two length ends of the detection unit, and each of two ends of the analog-to-digital conversion unit don't extend beyond two length ends of the detection unit. The first direction, the second direction, and the third direction intersect each other.

In some embodiments, the plurality of second circuit boards is sequentially arranged in the second direction; and the detection unit includes a photoelectric device and a substrate. The photoelectric device is disposed at a side of the substrate facing away from the signal transmission unit in the first direction. The photoelectric device is connected to a plurality of first connection portions of the substrate arranged at intervals in a second direction and a third direction. The first circuit board of the signal transmission unit is connected to a plurality of second connection portions of the substrate arranged at intervals in the second direction and the third direction. The plurality of second connection portions and the plurality of first connection portions are in one-to-one correspondence. In the second direction, an outermost first connection portion among the plurality of first connection portions is located at an outer side of an outermost second connection portion among the plurality of second connection portions.

A detector according to embodiments in a second aspect of the present disclosure includes: a support; and a plurality of detector modules according to the above embodiments in the first aspect of the present disclosure. At least two of the plurality of detector modules are sequentially arranged in a third direction and are both mounted at the support.

According to the detector of the embodiments of the present disclosure, by using the above detector module, the problem of overly dense wiring due to use of the high-density detector unit or the like can be effectively solved, while facilitating the enhancement of the spatial resolution.

In some embodiments, the support includes a plurality of heat sinks arranged at intervals in a second direction. The heat sink is at least connected to the second circuit board. The heat sink is disposed between two adjacent second circuit boards. The heat sink forms a heat exchange with the analog-to-digital conversion unit at each of the two adjacent second circuit boards.

A medical imaging apparatus according to embodiments in a third aspect of the present disclosure includes: a scanning frame formed with a scanning cavity configured to receive a scanning object; a radiation source; and the detector according to the embodiments in the second aspect of the present disclosure. The radiation source and the detector are respectively disposed at two radial sides of the scanning cavity and rotatable in a circumferential direction of the scanning cavity.

The medical imaging apparatus according to the embodiments of the present disclosure facilitates both the enhancement of the spatial resolution and the simplification of the wiring.

Additional aspects and advantages of the embodiments of present disclosure will be provided at least in part in the following description, or will become apparent in part from the following description, or can be learned from the practice of the embodiments of the present disclosure.

BRIEF DESCRIPTION OF DRAWINGS

These and other aspects and advantages of embodiments of the present disclosure will become apparent and more readily appreciated from the following descriptions made with reference to the accompanying drawings.

Figure 1:
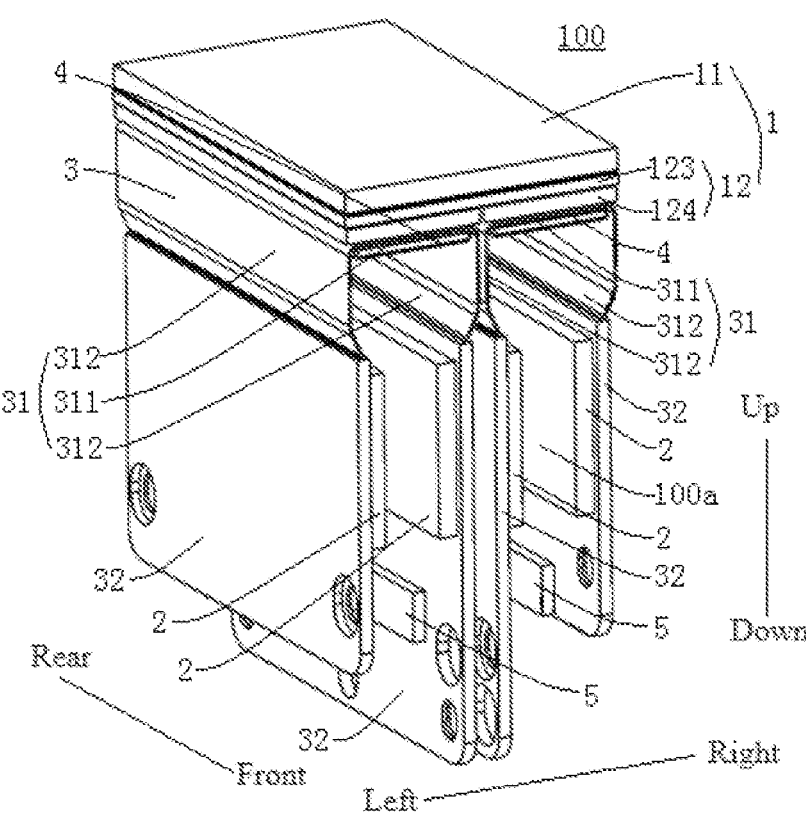
FIG. 1 is a schematic diagram of a detector module according to an embodiment of the present disclosure.

REFERENCE NUMERALS detector 200, detector module 100, accommodation space 100a, support 101, heat sink 1011,
detection unit 1, optoelectronic device 11,
substrate 12, a first connection portion 121, a second connection portion 122, a first board 123 and a second board 124,
analog-to-digital conversion unit 2, signal transmission unit 3,
first circuit board 31, first board portion 311, second board portion 312, second circuit board 32,
shielding unit 4, and connector 5.

DESCRIPTION OF EMBODIMENTS

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

The present disclosure below provides numbers of different embodiments or examples used to realize different structures of the present disclosure. In order to simplify the present disclosure, members and settings of particular examples are described below. They are, of course, only examples and are not intended to limit the present disclosure. Furthermore, the present disclosure may repeat reference numbers and/or letters in different examples. Such repetition is for purposes of simplicity and clarity and is not in itself indicative of a relationship between the various embodiments and/or settings discussed. In addition, various specific examples of processes and materials are provided in the present disclosure, but those skilled in the art may realize the applicability of other processes and/or the use of other materials.

A detector module 100 according to an embodiment of the present disclosure is described below with reference to the accompanying drawings.

As illustrated in FIG. 1, the detector module 100 includes a detection unit 1, analog-to-digital conversion units 2, and a signal transmission unit 3. The detection unit 1 is configured to convert an optical signal into an analog signal, the analog-to-digital conversion unit 2 (e.g., an AD chip) is configured to convert analog signals into digital signals, and the signal transmission unit 3 is connected to the detection unit 1 and the analog-to-digital conversion unit 2 and is configured to transmit the analog signal converted by the detection unit 1 to the analog-to-digital conversion unit 2.

The "optical signal" should be broadly construed, and a manifestation of the optical signal includes, but is not limited to, visible light, rays (e.g., X-rays), infrared light, etc. For example, the detection unit 1 is configured to convert a visible light signal into an analog signal, and the detector unit 1 may include a photoelectric device 11 (e.g., a photodiode, etc.). When the detector module 100 is applied in an apparatus that operates with a ray signal (e.g., a CT apparatus as described hereinafter), a scintillator may additionally be provided at the detector module 100. The scintillator is configured to convert the ray signal into a visible light signal, and the photoelectric device 11 is configured to the visible light signal converted by the scintillator to an analog signal. For another example, the detector unit 1 is configured to convert the ray signal to an analog signal, the detector unit 1 may be configured to indirectly convert the ray signal to an analog signal, the detector unit 1 may include a scintillator and the optoelectronic device 11, or the detector unit 1 may use a direct conversion material or the like to directly convert the ray signal to an analog signal.

As illustrated in FIG. 1, the signal transmission unit 3 is disposed at a side of the detection unit 1 in a first direction (e.g., an up-down direction in FIG. 1). The signal transmission unit 3 includes at least one first circuit board 31 and second circuit boards 32. Each first circuit board 31 is connected to the detection unit 1 and a plurality of the second circuit boards 32. Therefore, each first circuit board 31 can be configured to scatter and transmit at least part of the analog signal converted by the detection unit 1 to the plurality of second circuit boards 32. Each second circuit board 32 is connected to at least one analog-to-digital conversion unit 2, and each second circuit board 32 can be configured to transmit the received analog signal to a corresponding analog-to-digital conversion unit 2.

It is to be understood that, for a single first circuit board 31 and n second circuit boards 32 corresponding to the single first circuit board 31, where $n \geq 2$, the number of analog signals transmitted from each first circuit board 31 to the second circuit boards 32 may be equal or unequal to each other, i.e., each first circuit board 31 may divide the received analog signals into n equal or unequal parts to be transmitted to each of the n second circuit boards 32. When m first circuit boards 31 are provided, where $m \geq 2$, the analog signals received by each first circuit board 31 are a part of the analog signals converted by the detection unit 1, i.e., the analog signals converted by the detection unit 1 are divided into m equal or unequal parts to be transmitted to the m first circuit boards 31. In addition, the analog signals of the first circuit boards 31 are distributed to a plurality of second circuit boards 32, and therefore a number of lead wires at one side can be reduced. Thus, a thickness of a position at which the first circuit board 31 is connected to the second circuit board 32 is reduced, which facilitates bending.

It can be seen that, the analog signals converted by the detector unit 1 are scattered and transmitted to the plurality of analog-to-digital conversion units 2 through the signal transmission unit 3, to simplify wiring arrangement of the signal transmission unit 3. In this way, wiring density of the signal transmission unit 3 is easily lowered. Therefore, a detector unit 1 having a small pixel can be used to a certain extent. As such, in a same arrangement space, it is beneficial to appropriately increase a number of pixels of the detector unit 1, thereby improving spatial resolution of the detector module 100. Furthermore, as the number of pixels of the detection unit 1 increases, the number of analog-to-digital conversion units 2 also needs to increase correspondingly. The plurality of second circuit boards 32 in the embodiments of the present disclosure can also provide mounting convenience for the plurality of analog-to-digital conversion units 2. For example, one or more analog-to-digital conversion units 2 can be mounted at each second circuit board 32, to be adapted to a need for an increasing number of analog-to-digital conversion units 2.

The following description of the present disclosure provides an example where when the signal transmission unit 3 is configured to transmit at least some of the analog signals of the detection unit 1 to the analog-to-digital conversion unit 2, the signal transmission unit 3 is configured such that each first circuit board 31 is configured to scatter and transmit the at least some of the analog signals converted by the detection unit 1 to the corresponding plurality of second circuit boards 32. Those skilled in the art, after reading the following description, can easily understand other embodiments corresponding to the above connection arrangement of the signal transmission unit 3 of the embodiments of the present disclosure.

Exemplarily, the signal transmission unit 3 includes one first circuit board 31 and a plurality of second circuit boards 32. The first circuit board 31 is configured to receive all analog signals converted by the detection unit 1, divide all of the above analog signals into a plurality of portions, and transmit them to the plurality of second circuit boards 32, respectively, for transmission to the analog-to-digital conversion unit 2 through the second circuit boards 32, and thus all signals received by a plurality of analog-to-digital conversion units 2 connected to the plurality of second circuit boards 32 correspond to all analog signals converted by the detection unit 1. For example, the number of pixels of the detection unit 1 (e.g., the detection unit 1 uses a high-density diode with a pixel count of 2,048, whereas a standard-density diode typically has a pixel count of 512) is 2,048, and a maximum of 256 signals are received by a single analog-to-digital conversion unit 2. In this case, the first circuit board 31 is configured to divide the 2,048 signals into eight equal portions, and eight second circuit boards 32 are connected to the first circuit board 31, and each of the eight second circuit boards 32 is connected to one analog-to-digital conversion unit 2, to allow each analog-to-digital conversion unit 2 to receive 256 signals; alternatively, the first circuit board 31 is configured to divide the 2048 signals into four equal portions, and four second circuit boards 32 are connected to the first circuit board 31, and each of the four second circuit boards 32 may be connected to two analog-to-digital conversion units 2, to allow each analog-to-digital conversion units 2 to receive 256 signals.

Exemplarily, the signal transmission unit 3 includes two first circuit boards 31 and a plurality of second circuit boards 32. The received analog signals converted by the detection unit 1 are divided into two portions to be transmitted to the two first circuit boards 31, respectively. Each of the two first circuit boards 31 then divides the received analog signals into a plurality of portions and transmits them to the corresponding plurality of second circuit boards 32, respectively, for transmission to the analog-to-digital conversion unit 2 through the second circuit boards 32. Likewise, all signals received by the plurality of analog-to-digital conversion units 2 connected to the plurality of second circuit boards 32 corresponding to the two first circuit boards 31 correspond to all analog signals converted by the detection unit 1. For example, the number of pixels of the detection unit 1 is 2,048 and a maximum of 256 signals may be received by a single analog-to-digital conversion unit 2. In this case, each of the two first circuit boards 31 is configured to receive 1024 signals and divide the 1024 signals into four equal portions, and four second circuit boards 32 are connected to the first circuit board 31, and each second circuit board 32 is connected to one analog-to-digital conversion unit 2, to allow each of the analog-to-digital conversion units 2 to receive 256 signals. Alternatively, the first circuit board 31 is configured to divide 1024 signals into two equal portions, two second circuit boards 32 are connected to the first circuit board 31, and each of the two second circuit boards 32 may be connected to two analog-to-digital conversion units 2, to allow each analog-to-digital conversion unit 2 to receive 256 signals.

Obviously, in the above example, the plurality of second circuit boards 32 is connected to the detection unit 1 through the same first circuit board 31, to divide the signals received by the first circuit board 31 into the plurality of portions to be transmitted to the plurality of second circuit boards 32, respectively. In this way, the number of signals to be transmitted on the single second circuit board 32 is effectively reduced. Thus, wiring density and wiring difficulty of the signal transmission unit 3 are simplified to solve a problem of overly dense wiring. In other examples, the signal transmission unit 3 includes three or more first circuit boards 31 and a plurality of second circuit boards 32; and each of the second circuit boards 32 may be connected to three or more analog-to-digital conversion units 2.

According to the detector module 100 of the embodiments of the present disclosure, the signal transmission unit 3 includes the at least one first circuit board 31 and the second circuit boards 32. Each first circuit board 31 is connected to the detection unit 1 and the plurality of second circuit boards 32. Therefore, the signal transmission unit 3 is configured to transmit at least some of the analog signals of the detection unit 1 to the analog-to-digital conversion unit 2, to allow the signal transmission unit 3 to distribute the analog signals converted by the detection unit 1 to the plurality of first circuit boards 32 after at least one distribution. In this way, the number of signals transmitted on the single second circuit board 32 is effectively reduced. Thus, the wiring density and wiring difficulty of the signal transmission unit 3 are simplified to solve the problem of overly dense wiring. Even if the detector module 100 uses a high-density detector unit 1 (e.g., a high-density diode, etc.) to enhance the spatial resolution, the above technical solution of the present disclosure can also effectively reduce the wiring density of the signal transmission unit 3.

In some embodiments, as illustrated in FIG. 1, at least part of the first circuit board 31 has a thickness direction (e.g., the thickness direction of the first board portion 311 described later) parallel to the first direction, and the second circuit board 32 has a thickness direction parallel to a second direction (e.g., a left-right direction in FIG. 1). The analog-to-digital conversion unit 2 is disposed at a thickness side of a corresponding second circuit board 32. The plurality of the second circuit boards 32 is sequentially arranged in the second direction. The second direction intersects the first direction. It should be noted that the intersection in this embodiment includes perpendicularity, and the perpendicularity may be approximately perpendicularity, for example, an angle between the first direction and the second direction ranges from 85° to 95°.

It can be seen that, in the above technical solution, the thickness direction of the above at least part of the first circuit board 31 intersects the thickness direction of the second circuit board 32. As such, a plane where the above at least part of the first circuit board 31 is located substantially intersects a plane where the second circuit board 32 is located, which facilitates the connection of the first circuit board 31 to the plurality of second circuit boards 32. Furthermore, the plurality of the second circuit boards 32 connected to the same first circuit board 31 is less likely to interfere with each other. For example, the plurality of second circuit boards 32 connected to the same first circuit board 31 is easily arranged at intervals in parallel. In this case, the analog-to-digital converter unit 2 is disposed at the thickness side of the corresponding second circuit board 32, and therefore the second circuit board 32 provides sufficient space for the corresponding analog-to-digital converter unit 2 to be disposed in a plane that intersects the second direction, the analog-to-digital converter unit 2 disposed in the space neither occupies too much space in the second direction nor is susceptible to interfering with the first circuit board 31, especially when the thickness direction of the analog-to-digital conversion unit 2 is consistent with the thickness direction of the second circuit board 32.

In the embodiments of the present disclosure, two directions in parallel may be broadly understood to include the two directions in absolute parallel, as well as a small angle between the two directions such as an angle smaller than or equal to 20°, or an angle smaller than or equal to 10°, etc.

The present disclosure is not limited thereto. In other embodiments of the present disclosure, the plurality of second circuit boards 32 may be sequentially arranged in a third direction, and the third direction (e.g., a front-rear direction in FIG. 1), the first direction, and the second direction intersect each other. Alternatively, the plurality of second circuit boards 32 may be arranged in the second direction and the third direction. In this case, the plurality of second circuit boards 32 sequentially arranged in the third direction may be formed as a circuit board set, a plurality of circuit board sets is provided, and a plurality of circuit board sets is sequentially arranged in the second direction, and second circuit boards 32 contained in the plurality of circuit board sets may be equal or unequal in number. Alternatively, at least one circuit board set among the plurality of circuit board sets includes one second circuit board 32, and at least one circuit board set among the remaining circuit board sets includes a plurality of second circuit boards 32. The intersection in this embodiment includes perpendicularity, and the perpendicularity may be approximately intersecting, for example, an angle between any two directions ranges from 85° to 95°.

In some embodiments, as illustrated in FIG. 1, the first circuit board 31 includes a first board portion 311 and a plurality of second board portions 312. The first board portion 311 has a thickness direction parallel to the first direction and is connected to the detection unit 1. The plurality of second board portions 312 is arranged at intervals in the second direction, and each second board portion 312 has a first end bent to be connected to the first board portion 311 and a second end connected to one second circuit board 32. In this case, the first board portion 311 can receive at least some of the analog signals converted by the detection unit 1, and scatter and transmit them to the plurality of second board portions 312, and each second board portion 312 can transmit the received some of the analog signals to a corresponding second board 32. As such, the total number of signals received by the plurality of second boards 32 corresponding to the first board portion 311 is the same as the number of signals received by the first board portion 311.

It can be seen that, in the above technical solution, the first circuit board 31 includes the first board portion 311 and the plurality of second board portions 312, the plurality of second board portions 312 is arranged at intervals in the second direction, and each second board portion 312 is bent to be connected to the first board portion 311, such that an arrangement form of the plurality of second board portions 312 is consistent with an arrangement form of the plurality of second circuit boards 32. In this way, the second board portion 312 is easily connected to the corresponding second circuit board 32. Meanwhile, the bending connection of the second board portion 312 to the first board portion 311 can adapt to different arrangement postures of the first board portion 311 and the second circuit boards 32, to allow for the reliable connection of the first board portion 311 to the second circuit board 32. In addition, by distributing the analog signals of the first board portion 311 to a plurality of second board portions 312, a number of lead wires of the second board portion 312 is reduced. Thus, the thickness of the second board portion 312 can be reduce, which facilitates the bending.

Exemplarily, the first board portion 311 is a monolithic board. Alternatively, the first board portion 311 includes a first sub-board portion and a second sub-board portion that are arranged in the second direction. The first sub-board portion is connected to one second board portion 312, and the second sub-board portion is connected to another second board portion 312.

Exemplarily, as illustrated in FIG. 1, the second board portion 312 is arranged substantially parallel to a corresponding second circuit board 32, which facilitates increasing a connection area between the second board portion 312 and the corresponding second circuit board 32, thereby enhancing reliability of the connection reliability between the second board portion and the corresponding second circuit board 32. In other exemplary embodiments of the present disclosure, the second board portion 312 and the corresponding second circuit board 32 may be arranged in a non-parallel manner.

In other embodiments, the first circuit board 31 includes the first board portion 311 and no second board portion 312. In this case, the whole first circuit board 31 may have a thickness direction parallel to the first direction.

In some embodiments, as illustrated in FIG. 1, at least one of outermost two second board portions 312 in the second direction among the plurality of second board portions 312 has a second end extending towards a direction close to remaining second board portions 312 to be connected to the second circuit board 32. This helps to reduce an occupied space of the plurality of second board portions 312 in the second direction, facilitating the occupied space of the plurality of second board portions 312 in the second direction being smaller than or equal to an occupied space of the detection unit 1 in the second direction. Even if the above at least one of the outermost two second board portions 312 in the second direction among the plurality of second board portions 312 is adjacent to an edge of the detection unit 2 in the second direction, an outermost edge of the plurality of second board portions 312 in the second direction does not exceed beyond a corresponding edge of the detection unit 1 in the second direction.

It is to be understood that, in the above technical solution, the at least one of the outermost two second board portions 312 in the second direction among the plurality of second board portions 312 may be that a part of the above second board portion 312 adjacent to the second end of the above second board portion 312 extends towards the remaining second board portions 312 among the plurality of second board portions 312, or may be that the whole of the above second board portions 312 extends towards the remaining second board portions 312 among the plurality of second board portions 312 in the direction from the first end the to the second end.

It can be seen that, in the above-described technical solution, the at least one of the outermost two second board portions 312 in the second direction among the plurality of second board portions 312 has the second end extending along a straight line or a curve, and in an extending direction parallel to the second direction or forming an angle with the second direction.

Exemplarily, as illustrated in FIG. 1, the first direction is an up-down direction, the second direction is a right-left direction. An upper end of the second board portion 312 is the first end, and a lower end of the second board portion 312 is the second end. A lower part of a leftmost second board portion 312 among the plurality of second board portions 312 obliquely extends towards the right side to be connected to the second circuit board 32, and a lower part of a rightmost second board portion 312 among the plurality of second board portions 312 obliquely extends toward the left side to be connected to the second circuit board 32. In this case, an upper part of each of the leftmost second board portion 312 and the rightmost second board portion 312 is arranged vertically.

In some embodiments, as illustrated in FIG. 1, the first board portion 311 is connected to two second board portions 312, and the two second board portions 312 are disposed at two opposite ends of the first board portion 311, respectively. As such, one of the two second board portions 312 is disposed at one of the two opposite ends of the first board portion 311, and the other one of the two second board portion 312 is disposed at the other one of the two opposite ends of the first board portion 311, to simplify a structure of the first circuit board 31.

Further, in the above technical solution, the first circuit board 31 is a flexible circuit board. As such, the first board portion 311 and the second board portion 312 each are flexible circuit boards. In this case, the first circuit board 31 may be formed with the first board portion 311 and the second board portion 312 through bending a whole sheet of the flexible circuit board, which facilitates the arrangement of the first circuit board 31 and eliminates a need for additional board at the first board portion 311. In this way, the structure of the first circuit board 31 is simplified. Meanwhile, the first circuit board 31 can thus easily scatter and transmit the at least some of the analog signals of the detection unit 1 to the two second circuit boards 32 to simplify the wiring.

In other embodiments of the present disclosure, when the first circuit board 31 is a flexible circuit board, the first board portion 311 may be connected to three or more second board portions 312.

It is to be understood that, in the above technical solution, the first board portion 311 is connected to the two second board portions 312, and therefore the signals can be scattered and transmitted while appropriately increasing a distance between two adjacent second board portions 312 and a distance between two adjacent second circuit boards 32 by using fewer numbers of second board portions 312. In this way, the second circuit board 32 can easily provide a certain arrangement space for the analog-to-digital conversion unit 2 at at least one of two thickness sides of the second circuit board 32, without simultaneously causing the analog-to-digital conversion unit 2 to be excessively compact in the second direction, which helps to enhance convenience of heat dissipation for the analog-to-digital conversion unit 2.

In some embodiments, as illustrated in FIG. 1, the first board portion 311 is a rigid circuit board or a flexible circuit board, the second board portion 312 is a flexible circuit board, and the second circuit board 32 is a flexible circuit board or a rigid circuit board.

For example, when the first board portion 311 and the second board portion 312 each are flexible circuit boards, the first board portion 311 and the second board portion 312 may be formed by bending a whole sheet of flexible circuit board, which facilitates the arrangement of the first board portion 311 and the second board portion 312 and facilitates the bending connection of the first board portion 311 to the second board portion 312. In this case, the first circuit board 31 and the corresponding plurality of second circuit boards 32 may be formed a rigid-flexible board. For another example, when the first board portion 311 is a rigid circuit board and the second board portion 312 is a flexible circuit board, the bending part of the second board portion 312 is easily connected to the first board portion 311 and the second board portion 312, to realize the connection of the first board portion 311 to the plurality of second board portions 312. For example, the second board portion 312 is inserted and fitted to the first board portion 311, and at the same time, the first board portion 311 has certain strength and stiffness, which is convenient for the first board portion 311 to provide suitable surface flatness. Thus, convenience of the connection of the first board portion 311 to the detection unit 1 is enhanced. In addition, the second circuit board 32 is a rigid circuit board, and therefore the second circuit board 32 also has certain strength and stiffness, which is convenient for the second circuit board 32 to provide suitable surface flatness. When the analog-to-digital conversion unit 2 is disposed at a surface of the second circuit board 32 in the thickness side, the second circuit board 32 is easily connected to the analog-to-digital conversion unit 2, without using other structures to support the second circuit board 32 when the second circuit board 32 is connected to the analog-to-digital conversion unit 2.

In the example of FIG. 1, the analog-to-digital conversion unit 2 disposed at the second circuit board 32 is disposed closer to a side edge of the second circuit board 32 facing towards the detection unit 1 than a side edge of the second circuit board 32 facing away from the detection unit 1, to adapt to differentiated arrangement of a size of the second circuit board 32. Therefore, the second circuit board 32, regardless of the size of the second circuit board 32, can provide an arrangement space for the corresponding analog-to-digital conversion unit 2.

In another exemplary embodiment of the present disclosure, the module conversion unit 2 is connected to the second circuit board 32 through welding.

In some embodiments, as illustrated in FIG. 1, each of at least two adjacent second circuit boards 32 of the plurality of second circuit boards 32 connected to a same first circuit board 31 is configured as a predetermined circuit board. As such, for a same first circuit board 31, the number of predetermined circuit boards corresponding to this first circuit board 31 is smaller than or equal to the number of second circuit boards 32 corresponding to this first circuit board 31. Two adjacent predetermined circuit boards each have the analog-to-digital conversion unit 2 provided at opposite sides of the two adjacent predetermined circuit boards, and the analog-to-digital conversion units 2 at the two adjacent predetermined circuit boards are spaced apart from each other to define an accommodation space 100a adapted for mounting of a heat sink 1011. As such, the analog-to-digital conversion units 2 at the opposite sides of the two adjacent predetermined circuit boards can share a same heat sink 1011. The heat sink 1011 may at least dissipate heat generated by the analog-to-digital conversion unit 2, which helps to enhance use reliability of the analog-to-digital conversion unit 2, and helps to reduce a number of heat sinks 1011 with which the detector module 100 needs to cooperate, to simplify a structure of a detector 200.

Obviously, when the first circuit board 31 corresponds to two second circuit boards 32, and the two second circuit boards 32 each are predetermined circuit boards, the above technical solution is particularly applicable to a case where all of the analog-to-digital conversion units 2 connected to a single predetermined circuit board are provided at a same side of the predetermined circuit board in the second direction.

Exemplarily, as illustrated in FIG. 1, the first circuit board 31 corresponds to two second circuit boards 32, and each of the two second circuit boards 32 each are configured as a predetermined circuit board, i.e., the two second circuit boards 32 each have the analog-to-digital conversion unit 2 provided at opposite sides of the two second circuit boards 32. At least one analog-to-digital conversion unit 2 is provided at a side of each of the two second circuit boards 32 that faces towards the other one of the two second circuit boards 32 in the second direction, and the two analog-to-digital conversion units 2 at opposite sides of the second circuit boards 32 are spaced apart from each other in the second direction, to define an accommodation space 100a configured to accommodate the heat sink 1011. For another example, the first circuit board 31 corresponds to four second circuit boards 32, and each of the four second circuit boards 32 is configured as a predetermined circuit board.

Two of the four second circuit boards 32 each have the analog-to-digital conversion unit 2 provided at opposite sides of the two of the four second circuit boards 32, and remaining two of the four second circuit boards 32 each have the analog-to-digital conversion unit 2 at opposite sides of the remaining two of the four second circuit boards 32. The above two of the four second circuit boards 32 may share a same heat sink 1011, and the above remaining two of the four second circuit boards 32 share another heat sink 1011.

In some embodiments, as illustrated in FIG. 1, the detector module 100 further includes a shielding unit 4. The shielding unit 4 is disposed at the first circuit board 31 or the second circuit board 32. The shielding unit 4 is located at a side of a corresponding analog-to-digital conversion unit 2 (i.e., at least one analog-to-digital conversion unit 2 covered by the shielding unit 4 as described below) facing towards the detector unit 1 in the first direction. In the first direction, the shielding unit 4 covers at least one analog-to-digital conversion unit 2.

It can be seen that, in the first direction, the shielding unit 4 is located between the detection unit 1 and the corresponding analog-to-digital conversion unit 2, and a projection of the corresponding analog-to-digital conversion unit 2 in the first direction is located within a region of a projection of the shielding unit 4 in the first direction. Therefore, during a human eye is located at a side of the shielding unit 4 facing away from the corresponding analog-to-digital conversion unit 2 and observes in the first direction, the analog-to-digital conversion unit 2 is invisible to the human eye due to shielding of the shielding unit 4. As a result, when the detector module 100 is applied in a medical imaging apparatus, the shielding unit 4 can protect the analog-to-digital conversion unit 2 from being affected by a radiation source of the medical imaging apparatus.

It is to be understood that, in the above technical solution, correspondence between the shielding unit 4 and the analog-to-digital conversion unit 2 is not specifically limited, and it is only necessary to ensure that a single shielding unit 4 can cover at least one analog-to-digital conversion unit 2 in the first direction. The shielding unit 4 and the analog-to-digital conversion unit 2 that the shielding unit 4 covers can correspond to the same first circuit board 31, or the shielding unit 4 and at least one of the analog-to-digital conversion units 2 that the shielding unit 4 covers can correspond to different first circuit boards 31, respectively.

In another exemplary embodiment of the present disclosure, the shielding unit 4 is formed into a plate-like structure, to simplify a structure of the shielding unit 4 and facilitate mounting. In other embodiment of the present disclosure, the shielding unit 4 may be formed into other shapes without being limited to a plate-like structure.

In another exemplary embodiment of the present disclosure, the shielding unit 4 is a tungsten steel member, to shield radiation damage of the radiation source to the analog-to-digital conversion unit 2. In other embodiment of the present disclosure, the shielding unit 4 is not limited to the tungsten steel member, and other metallic members with shielding protection functions may be applicable to the embodiments of the present disclosure.

In some embodiments, as illustrated in FIG. 1, in the first direction, the shielding unit 4 covers all of the analog-to-digital conversion units 2 corresponding to the first circuit board 31, to realize shielding protection for all of the analog-to-digital conversion units 2 in the detector module 100 while reducing the number of shielding units 4 and saving the space occupied by the shielding unit 4. Thus, the structure of the detector module 100 is simplified. At the same time, the occupation of the arrangement space provided by the shielding unit 4 for the second circuit board 32 can be reduced, and the connection of the second circuit board 32 to the analog-to-digital conversion unit 2 can be facilitated.

It is to be understood that, when a plurality of first circuit board 31 is provided, a plurality of shielding unit 4 is also provided, and the shielding unit 4 and the first circuit board 31 are in one-to-one correspondence.

In some embodiments, as illustrated in FIG. 1, the first circuit board 31 is connected to two second circuit boards 32, and the two second circuit boards 32 are disposed at opposite ends of the first circuit board 31, respectively, facilitating the connection of the first circuit board 31 to the two second circuit boards 32. The two second circuit boards 32 connected to the same first circuit board 31 each have the analog-to-digital conversion unit 2 provided at opposite sides of the two second circuit boards 32. In this case, all the analog-to-digital conversion units 2 corresponding to the first circuit board 31 are disposed at opposite sides of the two second circuit boards 32 corresponding to the first circuit board 31, respectively. As a result, all of the analog-to-digital conversion units 2 corresponding to the first circuit board 31 are arranged in a slightly centralized manner, which helps to use a shielding unit 4 to cover all of the above analog-to-digital conversion units 2.

In the above technical solution, the shielding unit 4 may be disposed at the first circuit board 31, or at at least one of the two second circuit boards 32 corresponding to the first circuit board 31. For example, as illustrated in FIG. 1, the shielding unit 4 is supported at a side of a part of the first circuit board 31 connected to the detection unit 1 facing away from the detection unit 1. As such, the shielding unit 4 can serve a certain function in supporting the part of the first circuit board 31 connected to the detection unit 1. As a result, the above part of the first circuit board 31 has certain flatness, which facilitates the connection of the above part of the first circuit board 31 to the detection unit 1. At the same time, a position at which the shielding unit 4 is disposed does not affect the connection of the first circuit board 31 to the detection unit 1, which further enhances the convenience of the connection of the first circuit board 31 to the detection unit 1.

It can be seen that, in the above technical solution, the shielding unit 4 can not only serve to shield the radiation damage of the radiation source to the analog-to-digital conversion unit 2, but also can serve to support the part of the first circuit board 31 connected to the detection unit 1, facilitating realization of a "multi-purpose". In this way, it is advantageous to simplify the structure of the detector module 100 and appropriately reduce requirements for the part of the first circuit board 31 connected to the detector unit 1 in terms of structural strength and rigidity at the same time. When the part of the first circuit board 31 connected to the detector unit 1 is a flexible circuit board, the shielding unit 4 can serve a function in supporting the above the flexible circuit board, to facilitate the connection of the above flexible circuit board to the detector unit 1, without additionally providing a separate support structure.

Exemplarily, the shielding unit 4 is formed into a plate-like structure, to realize good support of the shielding unit 4 for the first circuit board 31.

In another exemplary embodiment of the present disclosure, in the example of FIG. 1, the first circuit board 31 includes a first board portion 311 and a plurality of second board portions 312. The first board portion 311 is connected to the detection unit 1. The plurality of second board portions 312 is disposed at a side of the first board portion 311 facing away from the detection unit 1, and each of the plurality of second board portions 312 is connected to one second circuit board 32. The shielding unit 4 is supported at the side of the first board portion 311 facing away from the detection unit 1. The first board portion 311 may be a rigid circuit board or a flexible circuit board. Further, the first board portion 311 is connected to two second board portions 312, all analog-to-digital conversion units 2 corresponding to the first board portion 311 are disposed at opposite sides of the two second circuit boards 32 corresponding to the first board portion 311 respectively, and in the first direction, the shielding unit 4 covers all of the analog-to-digital conversion units 2 corresponding to the first board portion 311.

In some embodiments, as illustrated in FIG. 1, a plurality of first circuit boards 31 is provided and arranged sequentially in a second direction and/or a third direction, and the first direction, the second direction, and the third direction intersect each other. Intersection in this embodiment includes perpendicularity, and the perpendicularity may be approximately perpendicularity, e.g., an angle between any two directions ranges from 85° to 95°.

As a result, by providing the plurality of first circuit boards 31, the analog signals converted by the detection unit 1 can be scattered and transmitted to the plurality of first circuit boards 31, to simplify wiring arrangement of the first circuit boards 31 and to reduce wiring density of the first circuit boards 31. Thus, the detection unit 1 having the small pixel can be used to a certain extent. As such, in the same arrangement space, it is beneficial to further increase the pixel number of the detection unit 1. That is, the analog signals converted by the detection unit 1 are scattered and transmitted twice to the plurality of analog-to-digital conversion units 2, which simplifies the wiring arrangement of the first circuit board 31 and the second circuit board 32, and helps to further improve the spatial resolution of the detector module 100.

Taking first direction as a thickness direction of the detector unit 1, the second direction as a width direction of the detector unit 1, and the third direction as a length direction of the detector unit 1 as an example, in the example of FIG. 1, two first circuit boards 31 are provided, and the two first circuit boards 31 are sequentially arranged in the second direction. In other examples of the present disclosure, three or more first circuit boards 31 may be arranged in the second direction.

It is to be understood that when the second direction is the width direction of the detection unit 1, the plurality of second circuit boards 32 sequentially arranged in the second direction facilitates the second circuit board 32 to provide a larger arrangement space for the analog-to-digital conversion unit 2 at at least one of two sides of the second circuit board 32 in the second direction.

In some embodiments, as illustrated in FIG. 1, in a second direction, two ends of the signal transmission unit 3 don't exceed beyond two width ends of the detection unit 1, and two ends of the analog-to-digital conversion unit 2 don't exceed beyond two width ends of the detection unit 1; and in a third direction, two ends of the signal transmission unit 3 don't exceed beyond two length ends of the detection unit 1, and two ends of the analog-to-digital conversion unit 2 don't exceed beyond two length ends of the detection unit 1. The first direction, the second direction, and the third direction intersect each other. It can be seen that, a projection of the signal transmission unit 3 in the first direction and a projection of the analog-to-digital conversion unit 2 in the first direction each are located in an outer contour of a projection of the detection unit 1 in the first direction, and therefore during the human eye is located at a side of the detection unit 1 facing away from the signal transmission unit 3 in the first direction and observes in the first direction, the signal transmission unit 3 and the analog-to-digital conversion unit 2 are invisible to the human eye due to shielding of the detection unit 1 for the signal transmission unit 3 and the analog-to-digital-conversion unit 2. The intersection in this embodiment includes perpendicularity, and the perpendicularity may be approximately perpendicularity, e.g., an angle between any two directions ranges from 85° to 95°.

As a result, when a plurality of detector modules 100 of the detector 200 is sequentially arranged in the second direction, detection units 1 of two adjacent detector modules 100 may be better spliced, which facilitates an appropriate reduction in a spacing between the two adjacent detection units 1 in the second direction. Thus, a non-detectable gap between the two adjacent detector units 1 is easily reduced, to ensure that a space occupied by the detector 200 in the second direction is easily saved under a premise where the detector 200 has suitable detection coverage. Likewise, when the plurality of detector modules 100 of the detector 200 is sequentially arranged in the third direction, detector units 1 of two adjacent detector modules 100 may be better spliced, which facilitates an appropriate reduction in the a spacing between the two adjacent detector units 1 in the third direction. Thus, a non-detectable gap between the two adjacent detector units 1 is easily reduced to ensure that a space occupied by the detector 200 in the third direction is easily reduced under the premise where the detector 200 has the appropriate detection coverage. When the plurality of detector modules 100 of the detector 200 is arranged in the second direction and the third direction, i.e., a plurality of detector modules 100 arranged in the second direction is formed as a module set, a plurality of module sets is arranged in the third direction. The detector units 1 of two adjacent detector modules 100 in the second direction are may be better spliced, while the detector units 1 of the two adjacent detector modules 100 in the third direction may also be better spliced, thereby facilitating saving of a space occupied by the detector 200 in the second direction and the third direction.

Obviously, the embodiments of the present disclosure can easily obtain more complete scanning data of a scanning part by reducing or eliminating as much as possible the gap between the detector units 1 of the adjacent detector modules 100, facilitating improvement of accuracy of a diagnostic result.

It can be seen that, in the above technical solution, it is beneficial to randomly splice the detector modules 100 in the second direction and/or the third direction by reasonably arranging the signal transmission unit 3 and the analog-to-digital conversion unit 2, which enhances splicing flexibility.

Figures 2A, 2B:
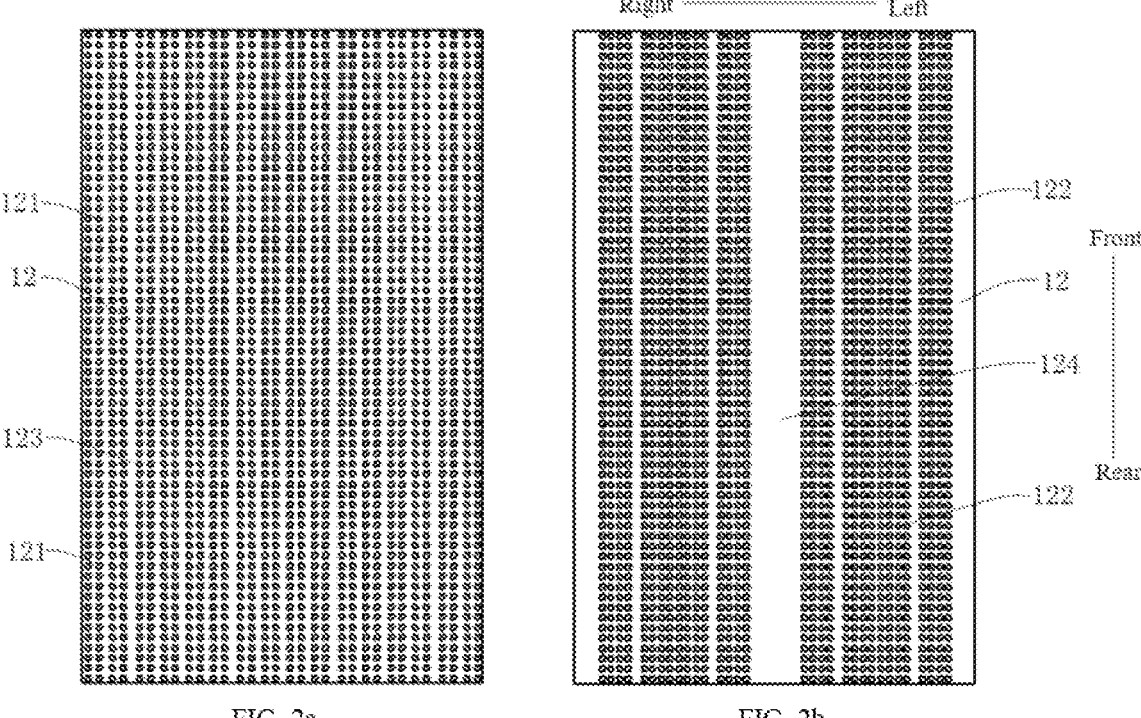
FIGS. 2a and 2b are schematic diagrams of a plurality of first connection portions and a plurality of second connection portions of the substrate illustrated in FIG. 1, respectively.
Figure 3:
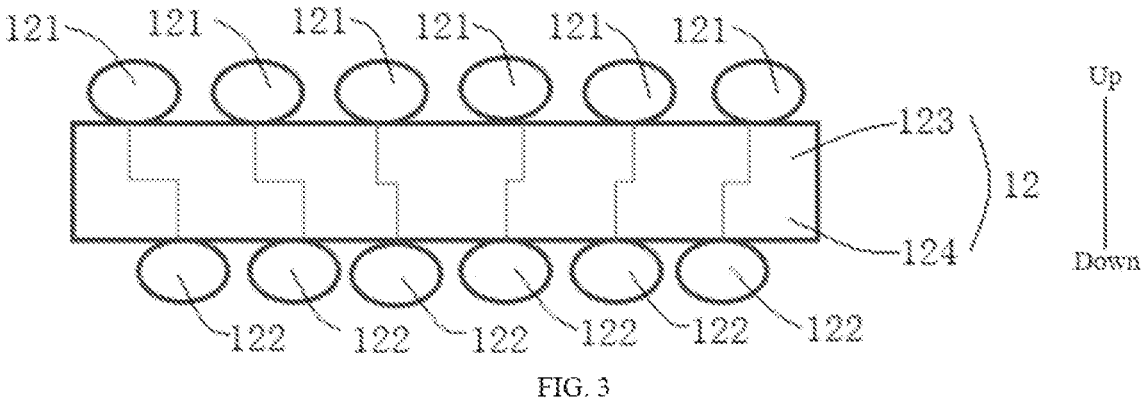
FIG. 3 is a schematic diagram of the substrate illustrated in FIG. 1.

In some embodiments, as illustrated in FIGS. 1 to 3, the plurality of second circuit boards 32 is sequentially arranged in the second direction, and the detector unit 1 includes an optoelectronic device 11 (or a pixel) and a substrate 12. The optoelectronic device 11 is disposed at a side of the substrate 12 facing away from the signal transmission unit 3 in the first direction. The optoelectronic device 11 is connected to a plurality of first connection portions 121 of the substrate 12. The plurality of first connection portions 121 is arranged at intervals in a second direction and a third direction. The first circuit board 31 of the signal transmission unit 3 is connected to a plurality of second connection portions 122 of the substrate 12. The plurality of second connection portions 122 is arranged at intervals in the second direction and the third direction. The plurality of second connection portions 122 and the plurality of first connection portions 121 are in one-to-one correspondence. Each of the plurality of second connection portions 122 is electrically connected to the corresponding one of the plurality of first connection portions 121.

In the above technical solution, since the signal transmission unit 3 includes at least one first circuit board 31, the plurality of second connection portions 122 of the substrate 12 are correspondingly connected to at least one first circuit board 31.

It can be seen that, the plurality of first connection portions 121 arranged at intervals in the second direction may be formed as a first connection set, and a plurality of first connection sets is provided and arranged at intervals in the third direction; and the plurality of second connection portions 122 arranged at intervals in the second direction may be formed as a second connection set, and a plurality of second connection sets is provided and arranged at intervals in the third direction. Obviously, the substrate 12 may be an Interposer substrate (or called a patch panel), which can realize an electrical connection between the optoelectronic device 11 and the first circuit board 31, i.e., a patch between the optoelectronic device 11 and the first circuit board 31, and thus realize the transmission of the analog signals converted by the optoelectronic device 11 through the substrate 12 to at least one first circuit board 31.

In the second direction, an outermost first connection portion 121 among the plurality of first connection portions 121 is located at an outer side of an outermost second connection portion 122 among the plurality of second connection portions 122, such that a width occupied by the plurality of second connection portions 122 in the second direction is smaller than a width occupied by the plurality of first connection portions 121 in the second direction. Therefore, when the first circuit board 31 is connected to the plurality of second connection portions 122, a width occupied by the first circuit board 31 in the second direction is effectively reduced. Thus, the two ends of the signal transmission unit 3 in the second direction don't extend beyond the two width ends of the detection unit 1. At the same time, since the plurality of second circuit boards 32 is arranged sequentially in the second direction, by setting a length of the signal transmission unit 3 in the third direction (e.g., setting a length of the first circuit board 31 in the third direction and a length of the second circuit board 32 in the third direction), it can be convenient for the two ends of the signal transmission unit 3 in the third direction not to extend beyond the two length ends of the detector unit 1.

In addition, when the signal transmission unit 3 needs to be bent, for example, when the part of the first circuit board 31 connected to the plurality of second connection portions 122 has a thickness direction parallel to the first direction, and the second circuit board 32 has a thickness direction parallel to the second direction, the signal transmission unit 3 can realize the connection of the first circuit board 31 to the second circuit board 32 through bending (for example, bending of the first circuit board 31, or bending of a connection position between the first circuit board 31 and the second circuit board 32). As such, a space corresponding to a width range of the plurality of first connection portions 121 in the second direction relative to a width range of the plurality of second connection portions 122 in the second direction can provide a sufficient bending space for the bending of the signal transmission unit 3. Therefore, even if the signal transmission unit 3 is bent, two width ends of the signal transmission unit 3 in the second direction after bending is less likely to exceed beyond the two width ends of the detection unit 2.

The signal transmission unit 3 including two first circuit boards 31 is taken as an example for illustration below, and those skilled in the art can easily understand the embodiment in which the signal transmission unit 3 includes one first circuit board 31, and the signal transmission unit 3 includes three or more first circuit boards 31 after reading the following description.

In examples of FIGS. 1 to 3, the first direction is an up-down direction, the second direction is a left-right direction, and the third direction is a front-rear direction. The detection unit 2 is horizontally arranged. The optoelectronic device 11 is disposed at an upper side of the substrate 12, and the signal transmission unit 3 is disposed at a lower side of the substrate 12. An upper side surface of the substrate 12 has a plurality of first connection portions 121 arranged at intervals in the left-right direction and in the front-rear direction, such that the plurality of first connection portions 121 is arranged in a plurality of rows and columns. A lower side surface of the substrate 12 has a plurality of second connection portions 122 arranged at intervals in the left-right direction and the front-rear direction, such that the plurality of second connection portions 122 is arranged in a plurality of rows and columns. Each second connection portion 122 is electrically connected to a corresponding first connection portion 121 through internal wiring of the substrate 12. All of the first connection portions 121 are connected to the optoelectronic device 11, and all of the second connection portions 122 are divided into two parts including a first region part and a second region part that are arranged in the left-right direction. All second connection portions 122 located in the first region part are connected to one of the first circuit boards 31, and all second connection portions 122 located in the second region part are connected to another one of the first circuit boards 31. The two first circuit boards 31 are sequentially arranged in the left-right direction.

The first region part is located at a left side of the second region part. Therefore, in the left-right direction, a plurality of second connection portions 122 arranged at intervals in the front-rear direction at a leftmost side of the first region part are located at a right side of a plurality of first connection portions 121 corresponding to these second connection portions 122, and a plurality of second connection portions 122 arranged at intervals in the front-rear direction at a rightmost side of the second region part are located at a left side of a plurality of first connection portions 121 corresponding to these second connection portions 122. Thus, each of a left side edge and a right side edge of a region occupied by all the second connection portions 122 is located between a left side edge and a right side edge of a region occupied by all the first connection portions 121.

In the embodiments of the present disclosure, each of the first connection portion 121 and the second connection portion 122 may be a solder pad formed at a surface of the substrate 12, the first connection portion 121 is soldered to the photovoltaic device 11, and the second connection portion 122 is soldered to the first circuit board 31. As such, all pads of the substrate 12 connected to the first circuit board 31 relative to all pads of the substrate 12 connected to the photovoltaic device 11 are disposed in the second direction in a inwardly shrunk manner, to enhance splicing flexibility of the detector module 100.

In the description of the present disclosure, it is to be understood that, terms such as "length", "width", "thickness", "over", "below", "front", "back", "left", "right", "in", "out", et., refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions. The terms could not to be construed to the limitation of the present disclosure. That is, the detector module 100 of the embodiments of the present disclosure has a placement posture not limited to the placement postures illustrated in FIG. 1 during use, transportation, etc.

It is to be understood that, in the second direction, the outermost first connection portion 121 among the plurality of first connection portions 121 is located at the outer side of the outermost second connection portion 122 among the plurality of second connection portions 122, which is realized in a manner including, but not limited to, that the plurality of first connection portions 121 and the plurality of second connection portions 122 are arranged in a same manner, and that, in the second direction, a distance between at least two adjacent second connection portions 122 is smaller than a distance between corresponding at least two adjacent first connection portions 121.

In another exemplary embodiment of the present disclosure, the substrate 12 is a multi-layer board. In a case where the substrate 12 is a double-layer board, the substrate 12 includes a first board 123 and a second board 124 sequentially arranged in a thickness direction of the substrate 12, the first connection portion 121 is disposed at a side of the first board 123 facing away from the second board 124, the second connection portion 122 is disposed at a side of the second board 124 facing away from the first board 123, and wiring between the first connection portion 121 and the second connection portion 122 may include a first section, a second section, and a third section that are sequentially arranged. The first section may extend in a thickness direction of the first board 123 and be disposed inside the first board 123. The third section may extend in a thickness direction of the second board 124 and be disposed inside the second board 124. The second section is bent to be connected between the first section and the third section, and the second section may be disposed at a side surface of the first board 123 facing towards the second board 124 and/or at a side surface of the second board 124 facing towards the first board 123, which enhances convenience of the wiring arrangement between the first connection portion 121 and the second connection portion 122. At the same time, the substrate 12 has a simple structure and is easy to be processed. In other embodiments of the present disclosure, the substrate 12 may be a three-layer or more than three-layer board.

In another exemplary embodiment of the present disclosure, the substrate 12 is an FR4 substrate. For example, the substrate 12 is a ceramic board, but the present disclosure is not limited to these embodiments.

In some embodiments, as illustrated in FIG. 1, a plurality of second circuit boards 32 is sequentially arranged in the second direction, a plurality of analog-to-digital conversion units 2 is provided and sequentially arranged in the second direction, and an outermost analog-to-digital conversion unit 2 in the second direction among the plurality of analog-to-digital conversion units 2 is disposed in an inner side of an outermost second circuit board 32 in the second direction among the plurality of second circuit boards 32. As a result, as long as the two ends of the signal transmission unit 2 in the second direction do not extend beyond the two length ends of the detection unit 1, the two ends of the analog-to-digital conversion unit 2 do not extend beyond the two length ends of the detection unit 1, which facilitates simplification of the design.

Exemplarily, as illustrated in FIG. 1, the second direction is a left-right direction, a leftmost analog-to-digital conversion unit 2 among the plurality of analog-to-digital conversion units 2 is disposed at a right side of a leftmost second circuit board 32 among the plurality of second circuit boards 32, and a rightmost analog-to-digital conversion unit 2 among the plurality of analog-to-digital conversion units 2 is disposed at a left side of a rightmost second circuit board 32 among the plurality of second circuit boards 32.

In some embodiments, as illustrated in FIG. 1, the detector module 100 further includes a connector 5 disposed at the second circuit board 32. The connector 5 and the first circuit board 31 may be in one-to-one correspondence, to electrically connect the signal transmission unit 3 to other components through the connector 5.

Figure 4:
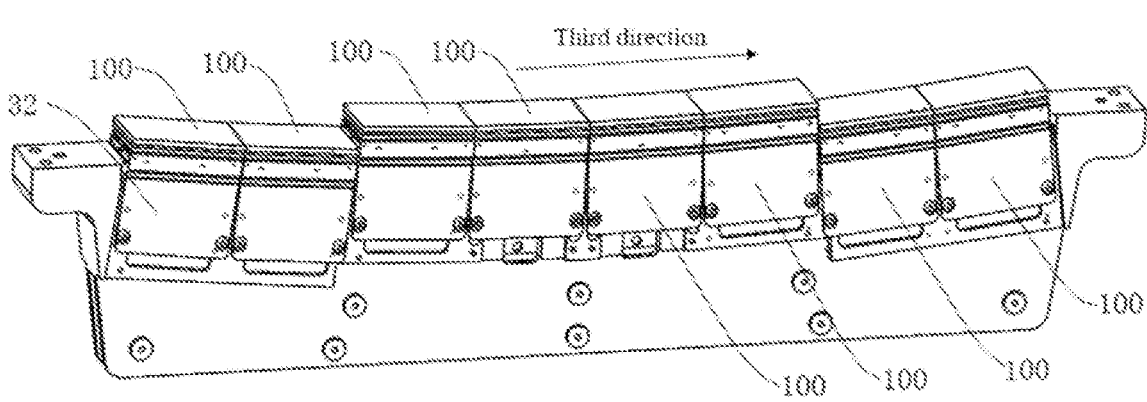
FIG. 4 is a schematic diagram of a detector according to an embodiment of the present disclosure.
Figure 5:
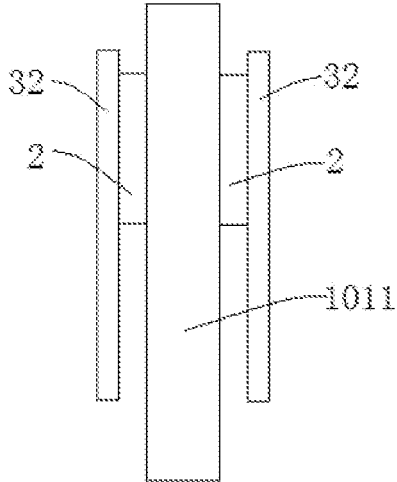
FIG. 5 is a schematic diagram of arrangement of the heat sink and the second circuit board illustrated in FIG. 4.
Figure 6:
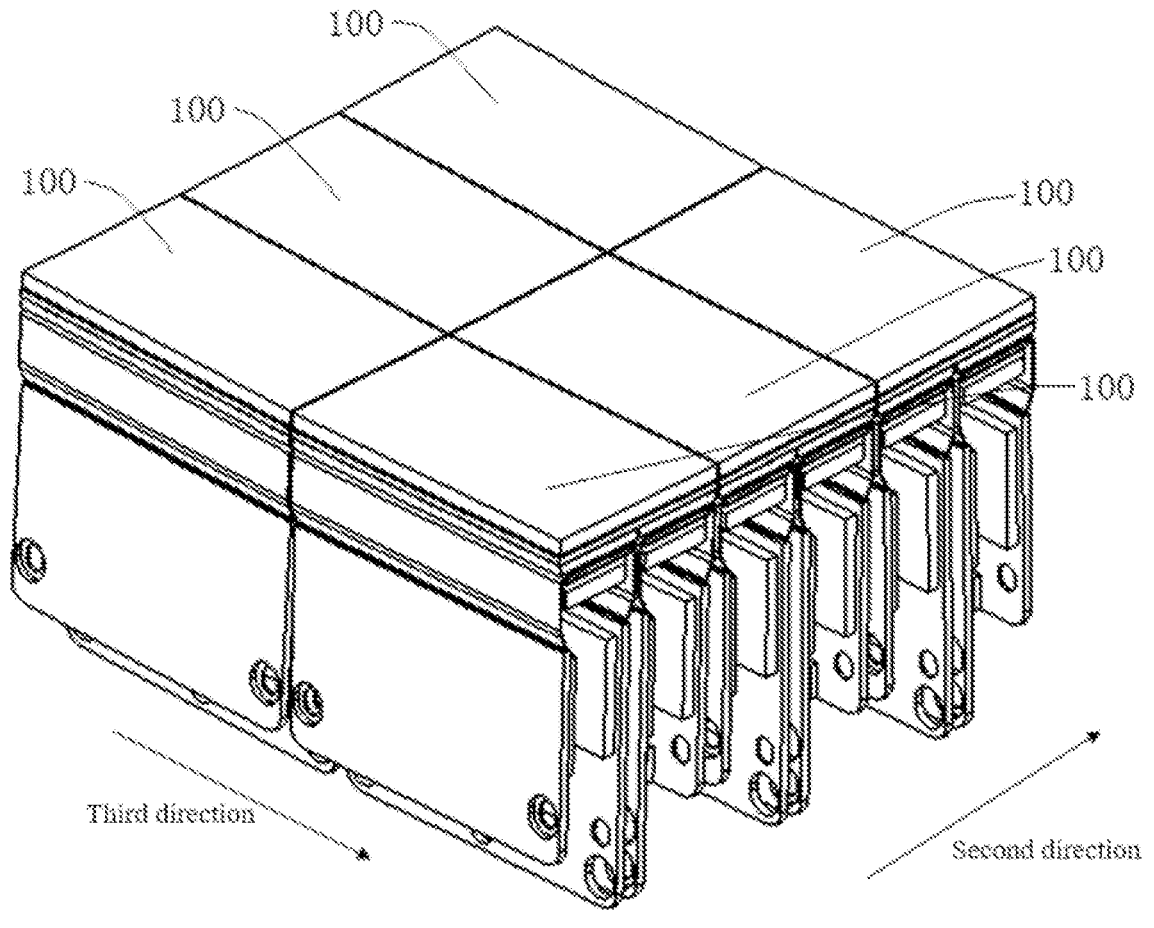
FIG. 6 is a schematic diagram of a detector according to an embodiment of the present disclosure.

The detector 200 according to embodiments in a second aspect of the present disclosure, as illustrated in FIGS. 4 to 6 includes a support 101 and a plurality of detector modules 100 according to the above embodiments in the first aspect of the present disclosure. At least two of the plurality of detector modules 100 are sequentially arranged in a third direction and are mounted at the support 101, and then the third direction may be a splicing direction of at least two of the detector modules 100 of the detector 200 at the support 101.

According to the detector 200 of the embodiments of the present disclosure, by using the above-described detector modules 100, the problem of overly dense wiring due to the use of the high-density detector unit or the like can be effectively solved, while facilitating the enhancement of the spatial resolution. Moreover, the detector 200 has been tested with images and has good effects.

In another exemplary embodiment of the present disclosure, as illustrated in FIG. 4, one support 101 is provided and extends in a third direction, and the plurality of detector modules 100 is sequentially arranged in the third direction; or, as illustrated in FIG. 6, a plurality of supports 101 is provided and sequentially arranged in a second direction, each of the plurality of supports 101 extends in the third direction and is provided with a plurality of detector module 100 that is sequentially arranged in the third direction.

In another exemplary embodiment of the present disclosure, the support 101 is a metallic member.

In another exemplary embodiment of the present disclosure, each support 101 may be provided with at most eight detector modules 100 that are arranged in the third direction, but the present disclosure is not limited to these embodiments.

In some embodiments, as illustrated in FIGS. 4 and 5, the support 101 includes a plurality of heat sinks 1011 that is arranged at intervals in a second direction. The heat sink 1011 is at least connected to the second circuit board 32 to realize reliable mounting of the detector module 100 at the support 101. For example, the support 101 may further be connected to the detection unit 1 (e.g., when the shielding unit 4 of the detector module 100 is supported at a side of a part of the first circuit board 31 connected to the detector unit 1 facing away from the detector unit 1, the support 101 may be connected to the detector unit 1 and the shielding unit 4), to realize reliable mounting of the detector module 100.

The heat sink 1011 is disposed between two adjacent second circuit boards 32, and the heat sink 1011 forms a heat exchange with the analog-to-digital conversion units 2 at the two adjacent second circuit boards 32, to allow the analog-to-digital conversion units 2 at the two adjacent second circuit boards 32 to share a same heat sink 1011. The heat sink 1011 can serve to at least dissipate heat generated by the analog-to-digital conversion units 2, which helps to reduce a number of heat sinks 1011 with which the detector module 100 needs to cooperate, to simplify a structure of a detector 200.

For example, in examples of FIGS. 1 and 5, when the first circuit board 31 corresponds to two second circuit boards 32, the heat sink 1011 and the first circuit board 31 may be in one-to-one correspondence, i.e., the heat sink 1011 may be disposed between the two second circuit boards 32 corresponding to the first circuit board 31. In other embodiments of the present disclosure, when the first circuit board 31 corresponds to three or more second circuit boards 32, the first circuit board 31 may correspond to a plurality of heat sinks 1011.

In another embodiment of the present disclosure, the heat sink 1011 may directly abut against the analog-to-digital converter unit 2 to form heat transfer cooperation, or may fit with other thermal conductive members (e.g., a thermal conductive adhesive, etc.) to form heat transfer cooperation.

A medical imaging apparatus according to embodiments in a third aspect of the present disclosure includes a scanning frame, a radiation source, and the detector 200 according to the embodiments in the second aspect described above. The scanning frame is formed with a scanning cavity configured to receive a scanning object. The radiation source and the detector 200 are disposed at two radial sides of the scanning cavity respectively and rotatable in a circumferential direction of the scanning cavity.

The medical imaging apparatus according to the embodiments of the present disclosure facilitates both the enhancement of the spatial resolution and the simplification of the wiring by using the detector 200 described above.

For example, the medical imaging apparatus is a CT apparatus. In this case, the first direction may be a radial direction of the scanning cavity, the second direction may be a circumferential direction of the scanning cavity, and the third direction may be an axial direction of the scanning cavity, and a plurality of detector modules 100 may be arranged substantially in an arc shape in the second direction. The radiation source is configured to emit X-rays, and the detector 200 is configured to detect attenuated rays that penetrate the scanning object, such as a human body, etc., and convert an optical signal of the received rays into an electrical signal. When the rays penetrate the scanning object, the scanning object attenuates the rays, and a degree of attenuation of numbers of rays penetrating the scanning object is different due to internal organizations and structures of the scanning object. Therefore, the numbers of rays penetrating the scanning object have diverse intensity. An optical signal of the attenuated rays is received by the detector 200 and converted into an electrical signal which is a signal representing the intensity of the ray penetrating the scanning object. The electrical signal generated by each detector module 100 is proportional to the intensity of the intensity of the received optical signal of the attenuated ray.

Other constitution as well as operations of the medical imaging apparatus according to the embodiments of the present disclosure are known to those of ordinary skill in the art, and details thereof are not described herein.

It should be noted that the feature defined with "first" and "second" may include one or more this feature. In the description of the present disclosure, "a plurality of" means at least two, for example, two or three, unless specified otherwise.

In the description of the present disclosure, it should be noted that unless specified or limited otherwise, the terms "mounted," "connected," and "connection" are understood broadly, such as fixed, detachable connections or integrated connection, and can be mechanical or electrical connections, and also can be direct and via media indirect connections, and further can be inner communications of two components, which can be understood by those skilled in the art according to the detail embodiment of the present disclosure.

In the present disclosure, the term "and/or" describes an association relationship between correlated objects, including three relationships. For example, "A and/or B" can mean A only, B only, or both A and B.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been illustrated and described, it is conceivable for those of ordinary skill in the art that various changes, modifications, replacements, and variations can be made to these embodiments without departing from the principles and spirit of the present disclosure. The scope of the present disclosure shall be defined by the claims as appended and their equivalents.

What is claimed is:

1. A detector module, comprising:
   a detection unit configured to convert an optical signal into an analog signal;
   analog-to-digital conversion units each configured to convert analog signals into digital signals; and
   a signal transmission unit disposed at a side of the detection unit in a first direction and comprising at least one first circuit board and second circuit boards, wherein:
   each of the at least one first circuit board is connected to the detection unit and a plurality of the second circuit boards, and is configured to distribute the analog signal received from the detection unit among the plurality of second circuit boards; and
   each of the second circuit boards is connected to at least one of the analog-to-digital conversion units, and is configured to transmit a received portion of the analog signal from a corresponding one of the at least one first circuit board to the at least one of the analog-to-digital conversion units.

2. The detector module according to claim 1, wherein:
   at least part of the first circuit board has a thickness direction parallel to the first direction;
   the second circuit board has a thickness direction parallel to a second direction;

the analog-to-digital conversion unit is disposed at a thickness side of a corresponding second circuit board; and the plurality of the second circuit boards is sequentially arranged in the second direction, the second direction intersecting the first direction.

3. The detector module according to claim 2, wherein:

the first circuit board comprises a first board portion and a plurality of second board portions, the first board portion has a thickness direction parallel to the first direction and is connected to the detection unit; and the plurality of second board portions is arranged at intervals in the second direction, and each of the plurality of second board portions has a first end bent to be connected to the first board portion and a second end connected to one second circuit board.

4. The detector module according to claim 3, wherein at least one of outermost two second board portions in the second direction among the plurality of second board portions has a second end extending towards a direction close to remaining second board portions among the plurality of second board portions to be connected to the second circuit board.

5. The detector module according to claim 3, wherein the first board portion is connected to two second board portions, and the two second board portions are disposed at two opposite ends of the first board portion, respectively.

6. The detector module according to claim 5, wherein the first board portion is a monolithic board, or the first board portion comprises a first sub-board portion and a second sub-board portion that are arranged in the second direction, the first sub-board portion being connected to one of the two second board portions, and the second sub-board portion being connected to the other one of the two second board portions.

7. The detector module according to claim 3, wherein:

the first board portion is a rigid circuit board or a flexible circuit board;

each of the plurality of second board portions is a flexible circuit board; and the second circuit board is a rigid circuit board or a flexible circuit board.

8. The detector module according to claim 2, wherein each of at least two adjacent second circuit boards of the plurality of second circuit boards connected to a same first circuit board is configured as a predetermined circuit board, two adjacent predetermined circuit boards each having the analog-to-digital conversion unit provided at opposite sides of the two adjacent predetermined circuit boards, and the analog-to-digital conversion units at the two adjacent predetermined circuit boards being spaced apart from each other to define an accommodation space adapted for mounting of a heat sink.

9. The detector module according to claim 1, further comprising:

a shielding unit disposed at the first circuit board or the second circuit board and located a side of a corresponding analog-to-digital conversion unit facing towards the detection unit in the first direction, wherein in the first direction, the shielding unit covers at least one analog-to-digital conversion unit.

10. The detector module according to claim 9, wherein:

the first circuit board is connected to two second circuit boards, respectively, and the two second circuit boards are disposed at opposite ends of the first circuit board;

the two second circuit boards connected to the same first circuit board each have the analog-to-digital conversion units respectively disposed at opposite sides of the two second circuit boards; and the shielding unit is supported at a side of a part of the first circuit board connected to the detection unit facing away from the detection unit.

11. The detector module according to claim 1, wherein the signal transmission unit is configured such that each of the at least one first circuit board is configured to scatter and transmit at least some of the analog signals converted by the detection unit to the corresponding plurality of second circuit boards.

12. The detector module according to claim 1, wherein a plurality of first circuit boards is provided and sequentially arranged in a second direction and/or a third direction, the first direction, the second direction, and the third direction intersecting each other.

13. The detector module according to claim 1, wherein:

in a second direction, two ends of the signal transmission unit don't extend beyond two width ends of the detection unit, and two ends of the analog-to-digital conversion unit don't extend beyond two width ends of the detection unit; and in a third direction, two ends of the signal transmission unit don't extend beyond two length ends of the detection unit, and each of two ends of the analog-to-digital conversion unit is smaller than or equal to two length ends of the detection unit, the first direction, the second direction, and the third direction intersecting each other.

14. The detector module according to claim 13, wherein:

the plurality of second circuit boards is sequentially arranged in the second direction; and the detection unit comprises a photoelectric device and a substrate, the photoelectric device being disposed at a side of the substrate facing away from the signal transmission unit in the first direction, the photoelectric device being connected to a plurality of first connection portions of the substrate arranged at intervals in a second direction and a third direction, the first circuit board of the signal transmission unit being connected to a plurality of second connection portions of the substrate arranged at intervals in the second direction and the third direction, the plurality of second connection portions and the plurality of first connection portions being in one-to-one correspondence, and in the second direction, an outermost first connection portion among the plurality of first connection portions being located at an outer side of an outermost second connection portion among the plurality of second connection portions.

15. A detector, comprising:

a support; and a plurality of detector modules, wherein each of the plurality of detector modules comprises:

a detection unit configured to convert an optical signal into an analog signal;

analog-to-digital conversion units each configured to convert analog signals into digital signals; and a signal transmission unit disposed at a side of the detection unit in a first direction and comprising at least one first circuit board and second circuit boards, wherein each of the at least one first circuit board is connected to the detection unit and a plurality of the second circuit boards, and is configured to distribute the analog signal received from the detection unit among the plurality of second circuit boards, and each of the second circuit boards is connected to at least one of the analog-to-digital conversion units, and is configured to transmit a received portion of the analog signal from a corresponding one of the at least one first circuit board to the at least one of the analog-to-digital conversion units;

wherein at least two of the plurality of detector modules are sequentially arranged in a third direction and are both mounted at the support.

16. The detector according to claim 15, wherein:

the support comprises a plurality of heat sinks arranged at intervals in a second direction, the heat sink being at least connected to the second circuit board, the heat sink being disposed between two adjacent second circuit boards, and the heat sink forming a heat exchange with the analog-to-digital conversion unit at each of the two adjacent second circuit boards.

17. The detector according to claim 15, wherein:

at least part of the first circuit board has a thickness direction parallel to the first direction;

the second circuit board has a thickness direction parallel to a second direction;

the analog-to-digital conversion unit is disposed at a thickness side of a corresponding second circuit board; and the plurality of the second circuit boards is sequentially arranged in the second direction, the second direction intersecting the first direction.

18. The detector according to claim 17, wherein:

the first circuit board comprises a first board portion and a plurality of second board portions, the first board portion has a thickness direction parallel to the first direction and is connected to the detection unit; and the plurality of second board portions is arranged at intervals in the second direction, and each of the plurality of second board portions has a first end bent to be connected to the first board portion and a second end connected to one second circuit board.

19. The detector according to claim 18, wherein at least one of outermost two second board portions in the second direction among the plurality of second board portions has a second end extending towards a direction close to remaining second board portions among the plurality of second board portions to be connected to the second circuit board.

20. A medical imaging apparatus, comprising:

a scanning frame formed with a scanning cavity configured to receive a scanning object;

a radiation source; and a detector, the detector comprising a support and a plurality of detector modules, wherein each of the plurality of detector modules comprises:

a detection unit configured to convert an optical signal into an analog signal;

analog-to-digital conversion units each configured to convert analog signals into digital signals; and a signal transmission unit disposed at a side of the detection unit in a first direction and comprising at least one first circuit board and second circuit boards, wherein each of the at least one first circuit board is connected to the detection unit and a plurality of the second circuit boards, and is configured to distribute the analog signal received from the detection unit among the plurality of second circuit boards, and each of the second circuit boards is connected to at least one of the analog-to-digital conversion units, and is configured to transmit a received portion of the analog signal from a corresponding one of the at least one first circuit board to the at least one of the analog-to-digital conversion units, wherein the radiation source and the detector are respectively disposed at two radial sides of the scanning cavity and rotatable in a circumferential direction of the scanning cavity.

* * * * *